United States Patent
Sanchez Lite et al.

(10) Patent No.: US 8,449,711 B2
(45) Date of Patent: May 28, 2013

(54) METHOD FOR MANUFACTURING A MOTOR VEHICLE TRIM PANEL

(75) Inventors: Alberto Sanchez Lite, Valladolid (ES); Ignacio Rodriguez Gonzalez, Burgos (ES)

(73) Assignee: Grupo Antolin-Ingenieria, S.A., Burgos (ES)

( * ) Notice: Subject to any disclaimer, the term of this patent is extended or adjusted under 35 U.S.C. 154(b) by 0 days.

(21) Appl. No.: 13/060,413

(22) PCT Filed: Sep. 3, 2009

(86) PCT No.: PCT/ES2009/070366
§ 371 (c)(1),
(2), (4) Date: Feb. 23, 2011

(87) PCT Pub. No.: WO2010/043737
PCT Pub. Date: Apr. 22, 2010

(65) Prior Publication Data
US 2011/0186216 A1    Aug. 4, 2011

(30) Foreign Application Priority Data

Oct. 17, 2008   (EP) ................................... 08381034

(51) Int. Cl.
*B29C 65/00* (2006.01)
*B32B 37/00* (2006.01)
*B32B 38/04* (2006.01)
*B29D 7/00* (2006.01)

(52) U.S. Cl.
USPC ............. 156/256; 156/267; 156/270; 156/78; 264/211.2; 264/45.9

(58) Field of Classification Search
USPC   156/78, 79, 256, 267, 270, 273.7; 264/211.2, 264/210.1, 211.12, 46.1, 177.17, 177.2, 45.9
See application file for complete search history.

(56) References Cited

U.S. PATENT DOCUMENTS

| | | | |
|---|---|---|---|
| 3,860,371 A | 1/1975 | Willy | |
| 5,486,256 A | 1/1996 | Romesberg et al. | |
| 5,656,675 A * | 8/1997 | Kobayashi et al. | 521/79 |
| 5,976,646 A | 11/1999 | Stevens et al. | |
| 6,294,116 B1 | 9/2001 | Shih et al. | |
| 6,613,172 B1 * | 9/2003 | Tsujimoto et al. | 156/78 |
| 7,361,294 B2 * | 4/2008 | Pierick et al. | 264/50 |
| 7,582,352 B2 * | 9/2009 | Kobayashi et al. | 428/319.3 |
| 7,671,164 B2 * | 3/2010 | Brack et al. | 528/190 |
| 7,935,756 B2 * | 5/2011 | Suzuki et al. | 524/575 |
| 2001/0002075 A1 | 5/2001 | Chaudhary et al. | |

FOREIGN PATENT DOCUMENTS

EP   0711808   5/1996

OTHER PUBLICATIONS

International Search Report for PCT/ES2009/070366 issued Sep. 6, 2010.

* cited by examiner

*Primary Examiner* — Linda L Gray
(74) *Attorney, Agent, or Firm* — Banner & Witcoff, Ltd.

(57) ABSTRACT

The invention consists of a method for manufacturing a vehicle trim panel so that the sheet of thermoplastic foam that forms the central core of the trim is made from a mixture of thermoplastic material, additives and fibre reinforcement, where the fibre reinforcement forms an integral part of the sheet thermoplastic foam.

16 Claims, 4 Drawing Sheets

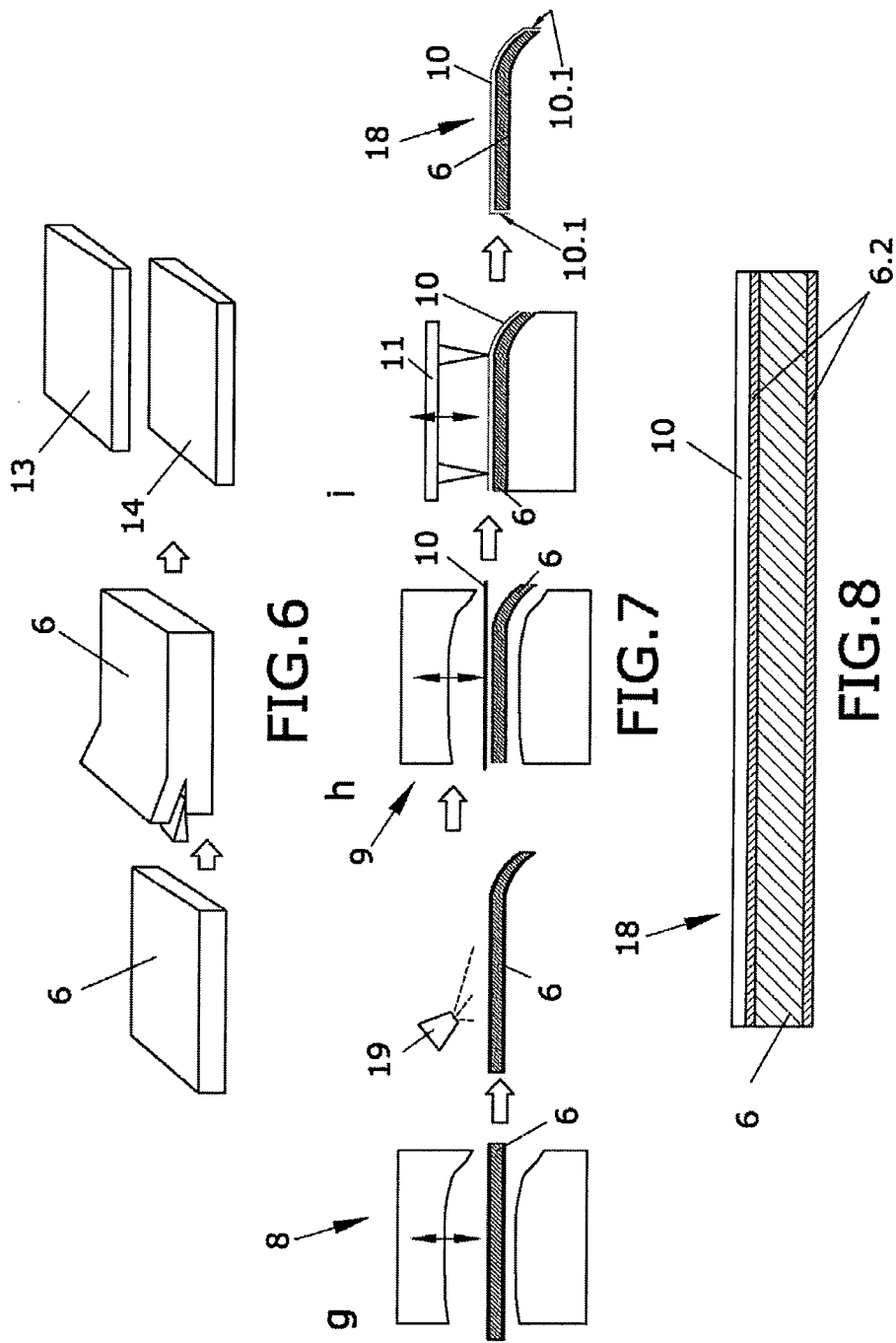

ered by reference herein in their entireties.
METHOD FOR MANUFACTURING A MOTOR VEHICLE TRIM PANEL The present application is a U.S. National Phase Application Under 35 USC §371 and applicant herewith claims the benefit of priority of PCT/ES2009/070366 filed Sep. 3, 2009 which claims priority to European Application No. 08381034.1 Filed Oct. 17, 2008, which are incorporated by reference herein in their entireties.

OBJECT OF THE INVENTION

The present invention relates to a method for manufacturing a vehicle trim panel with a central core made from at least one sheet of thermoplastic foam.

In particular the invention relates to a method for manufacturing a simple and economical vehicle trim panel.

With this objective, the invention discloses a method for manufacturing a vehicle trim panel so that the sheet of thermoplastic foam that forms the central core of the trim is made from a mixture of thermoplastic material, additives and fibre reinforcement, wherein the fibre reinforcement forms an integral part of the sheet of thermoplastic foam.

BACKGROUND OF THE INVENTION

Trim panels are normally manufactured by means of hot and cold forming of a laminate consisting of several sheets or layers.

The trim consists of two main parts, one structural part called a substrate, which makes it self-supporting, and at least one decorative outer part called a covering.

The decorative covering is applied to the visible face of the trim, i.e. the surface of the trim that the user sees and perceives when they are inside the vehicle.

Additionally, a second protective covering can be applied to the non-visible face to cover the substrate on the surface of the trim that corresponds with the bodywork of the vehicle or the surface that is not seen by the user.

The substrate normally consists of a central core, adhesive and a reinforcement material situated in correspondence with each of the upper and lower faces of the sheet, so that these three elements are what make the end product, which in this case is the trim panel, sufficiently rigid for the customers requirements.

The central core normally consists of a sheet of foam or a sheet of interwoven fibres. This central core can also be completely or partially impregnated with a resin in order to make the sheet more rigid.

The reinforcement material that is applied to the upper and lower faces of the sheet that forms the central core can take the form of a chopped-fibre roving or mat.

In any case, the use of fibre reinforcement as an additional component to the central core is necessary to achieve the levels of rigidity and self-support required by the customer for this product.

Fibre reinforcement and fibreglass, in particular, is a material that causes many handling problems in a production line. Fibreglass is abrasive to the production facilities and harmful to the operators who handle it.

The problem with fibreglass can be lessened by using a different type of fibre, such as natural fibres. This type of fibres does not always achieve the required levels of rigidity and in any case they are an additional part to handle when manufacturing the trim panel.

Examples of this type of trim manufacturing process can be found in American patents U.S. Pat. Nos. 5,976,646 and 5,486,256.

In order to overcome above inconvenient, it is known from EP0711808, a method for manufacturing vehicle trim panels, wherein the number of independent components to be used for the manufacturing thereof is reduced. This procedure is based on the incorporation of the reinforcement fibre as integral part of the sheet of foam which forms the central core of the vehicle trim panel.

Although this procedure simplifies, reduces costs and improves the health and safety conditions of the manufacturing process, it does not carry out a control of the reinforcement fibre distribution in the sheet of foam in order to achieve a sheet of foam with optimal features of rigidity.

Therefore, present invention consists of a procedure for obtaining a vehicle trim panel wherein the central core of the panel incorporates reinforcement fibre as integral part of it and wherein rigidity properties of the sheet of foam have been improved by controlling the reinforcement fibre distribution in said sheet of foam.

DESCRIPTION OF THE INVENTION

The present invention consists of a method for manufacturing a vehicle trim panel with a central core that is made from a sheet of thermoplastic foam produced by means of mixing a thermoplastic material with additives and fibre reinforcement so that all of said elements form an integral part of the sheet of foam that constitutes the central core of the trim panel.

A first aspect of the invention relates to a method for manufacturing a vehicle trim panel that comprises the following steps:

a. Dosing at least the following components:
Polyolefin
Fibre reinforcement
Additives,
Wherein at least one part of the polyolefin is pre-mixed with the additives to form a concentrate, and wherein the additives consist of at least one foaming agent,
b. Heating and homogenising the components used in step a) to produce a homogeneous mixture of the components,
c. Producing a sheet made from the homogeneous mixture of components produced in step b),
d. Heating, cross-linking and foaming the sheet produced in step c),
e. Cutting the foamed sheet product produced in step d) to produce a first sheet of foam,
f. Pre-heating the first sheet of foam,
g. Cold forming at least the first sheet of foam,
h. Covering at least the sheet of foam by means of applying a second sheet of covering that corresponds with at least one of the upper and lower faces of the first sheet of foam,
i. Cutting the trim panel that is produced to remove the surplus material.

The incorporation of fibre reinforcement in the sheet of foam that forms the central core provides it with enhanced rigidity properties, thus normally avoiding the use of fibre reinforcement as an independent part during the manufacturing process of the trim panel.

It is thus possible to simplify the manufacturing process and thereby shorten the cycle of the manufacturing process, reducing the cost of producing the trim panel.

Additionally, in the particular case where fibreglass is used as the added fibre reinforcement, it is possible to improve the health and safety conditions of the trim panel production line.

DESCRIPTION OF THE DRAWINGS

The present specification is complemented with a set of non-limiting, illustrative figures by way of an example of the preferred embodiment of the invention.

FIG. 6 shows a diagram of a process for cutting the first sheet of foam to produce several sheets.

FIG. 7 shows a diagram of a variant of the process wherein the trim panel is crimped.

FIG. 8 shows a diagram of an example of the trim produced by the manufacturing method disclosed herein.

PREFERRED EMBODIMENT OF THE INVENTION

Figure 1:
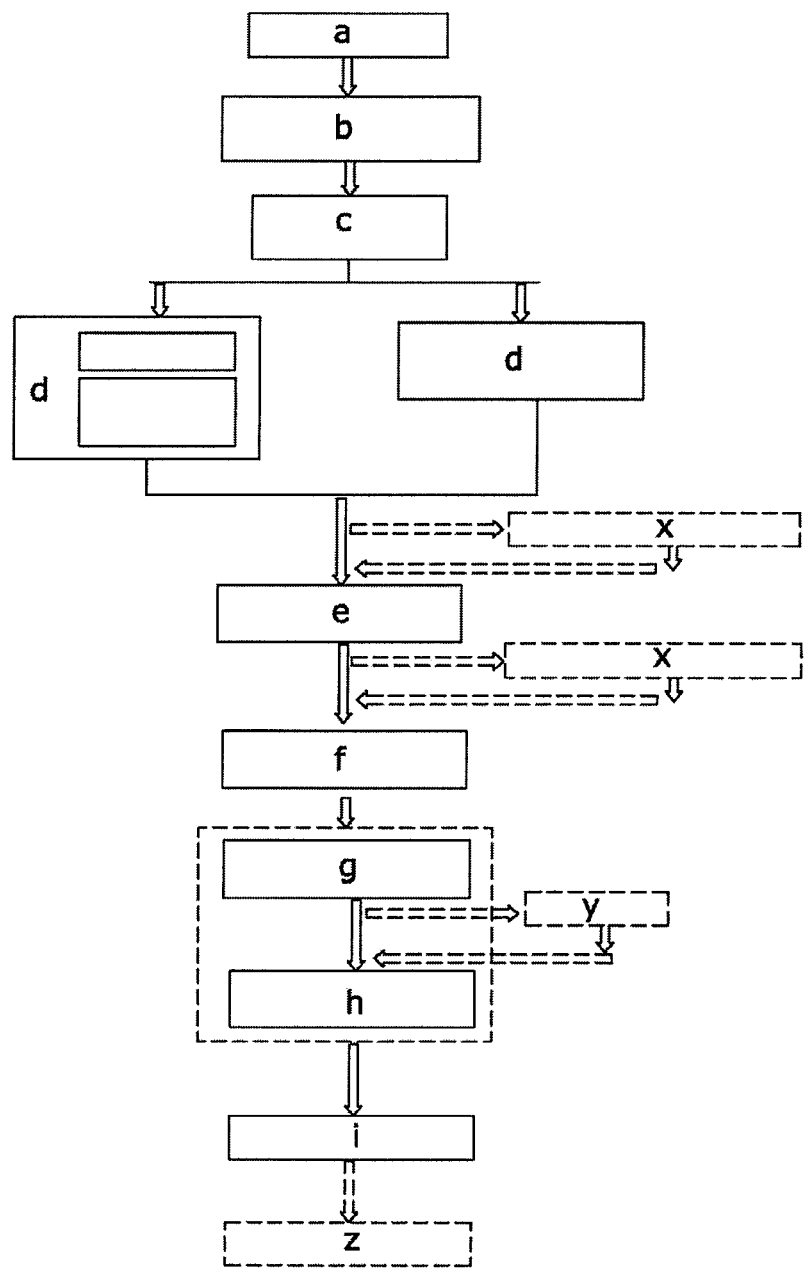
FIG. 1 shows a flow diagram of the method for producing the trim panel.

In view of the above, the present invention relates to a method for manufacturing a vehicle trim panel from a sheet of thermoplastic foam formed by homogeneously mixing at least a polyolefin and additives, whereto fibre reinforcement is added so that all of these components form an integral part of the first sheet of foam that forms the central core of the trim panel.

Before describing each of the steps that form part of the process for producing the first sheet of foam that forms the central core of the trim panel, the components (1) that form said first sheet of foam (6) are described: polyolefin, additives and fibre reinforcement.

The polyolefin (1.1) is the main component of the first sheet of foam (6), thus constituting the basis of the mixture of components (1).

This polyolefin (1.1) can be e.g. polyethylene or polypropylene or a mixture of these two polymers.

The second component that forms part of the first sheet of foam (6) and is the main reason for the rigidity of this sheet is fibre reinforcement (1.2).

The fibre reinforcement (1.2) is used as filler in the mixture of the components (1) intended to improve the rigidity of the first sheet of foam (6), in addition to increasing the stability thereof during the foaming process. This fibre reinforcement (1.2) can be chopped fibre and is preferably fibreglass, although natural fibres could also be used such as hemp, jute or sisal, for example.

Finally, the third component that forms the first sheet of foam (6) is additives (1.3), in particular at least a chemical foaming agent that makes the polyolefin (1.1) foam.

This foaming agent is constituted by reactive additives that can release a gas as a result of a chemical reaction. This gas is generally nitrogen or carbon dioxide, and it forms the cells that comprise the foam's structure.

The foaming agent used has a decomposition temperature that is higher than that of the softening point of the homogeneous mixture (2.6) of components (1), resulting from heating and homogenising the components (1).

Preferably, the foaming agent used is selected from: azodicarbonamide, polybenzenesulfonehydrazine, 4,4'diphenyl-sulfonylazide, p,p'oxybis (benzenesulphonylhydrazide) or dinitrosopentamethylenetetraamine.

The percentage by weight of foaming agent used in the mixture formed by the compound (1.1) is 0.5-30%, thus ensuring the production of foam, since foam would not be produced with a percentage below the lower limit and the foam would lose properties with a percentage above the upper limit, as too much gas would be released and it could not be retained by the cross-linked polymer.

In addition to the foaming agent, it is possible to use other additives such as dyes, which are responsible for the colour of the resulting sheet product, or fire retardants, intended to reduce the flammability of the plastic and/or cross-linking agents.

The cross-linking agent forms part of the additives (1.3) if the polyolefin is cross-linked by a chemical reaction. If the cross-linking is carried out by means of a physical process, this cross-linking agent will not form part of the mixture of components (1).

The cross-linking agent is formed by an organic peroxide with a decomposition temperature that is lower than that of the foaming agent, or with a decomposition rate that is higher than that of the foaming agent.

The organic peroxides used are preferably selected from tertbutylperbenzoate, benzoyl peroxide, 2,4dichlorobenzoyl peroxide, acetyl peroxide, lauryl peroxide, methylethylketone peroxide or dicumyl peroxide.

The percentage by weight of cross-linking agent used is 0.1-10%, as the production of cross-linked foam is ensured between these limits to prevent excessive cross-linking of the polyolefin (1.1), with a risk of breakage thereof during foaming.

The components (1) that form part of the mixture can take several forms at the beginning of the process, according to how said components (1) are pre-mixed with each other.

In order to facilitate the incorporation of the additives (1.3) into the polyolefin (1.1) a concentrate is used, wherein a high concentration of additives (1.3) is dispersed in the polyolefin (1.1).

This concentrate is used to facilitate the subsequent incorporation of additives (1.3) into the final polymer because if the polyolefin (1.1) is mixed directly with the additives (1.3) as separate components, this mixture of the two components is less homogeneous. However, if this mixture consists of polyolefin (1.1) and the concentrate that is produced by first mixing a high concentration of additives (1.3) with polyolefin (1.1), the end result is a homogeneous polymer comprising polyolefin (1.1) and additives (1.3).

As described above, the additives (1.3) used are at least a chemical foaming agent, and it may additionally have at least a chemical cross-linking agent, dyes and/or fire retardants, among others.

In addition to this concentrate, made from a high concentration of additives, it may contain pre-mixed fibre reinforcement (1.2).

On the other hand, this fibre reinforcement (1.2) can also be pre-mixed with polyolefin (1.1) and can have the concentrate comprising only additives (1.3) and polyolefin (1.1).

Another possibility could be that the fibre reinforcement (1.2) is cut and not pre-mixed with polyolefin (1.1).

A schematic summary of some of the combinations of components (1) that can be used as starting materials in the process of producing the first sheet of foam (6) is presented below:

Combination 1:
i) Concentrate made from additives (1.3) and a polyolefin base (1.1)
ii) Concentrate made from fibre reinforcement (1.2) and a polyolefin base (1.1)
iii) Polyolefin (1.1)

Combination 2:
i) Concentrate made from additives (1.3), fibre reinforcement (1.2) and a polyolefin base (1.1)
ii) Polyolefin (1.1)

Combination 3:
i) Concentrate made from additives (1.3) and a polyolefin base (1.1)
ii) Polyolefin (1.1)
iii) Fibre reinforcement (1.2)

Now that the components (1) that form part of the mixture of components (1) that will produce the first sheet of foam (6) and some of the possible combinations for pre-mixtures between them have been described, the steps that form part of the process of manufacturing a vehicle trim panel (18) will be described.

This process of manufacturing a trim panel (18) can be subdivided into two broad phases: the first, PHASE A, for manufacturing the central core that forms the trim panel (18), i.e. the process of manufacturing the first sheet of foam (6); and the second, PHASE B, for manufacturing the trim panel (18) itself from said first sheet of foam (6).

Figure 2:
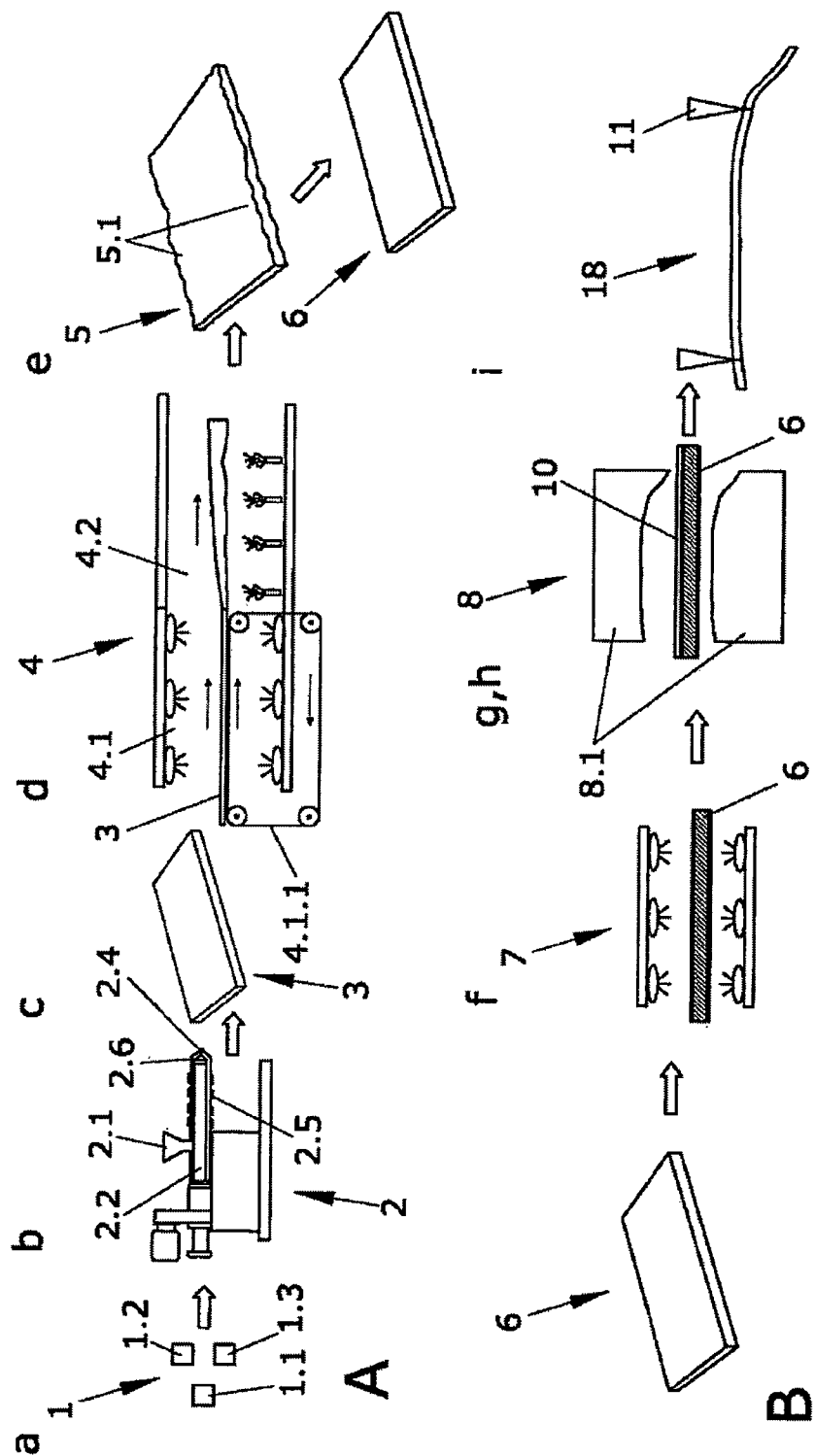
FIG. 2 shows a diagram of the facility used to carry out the method for manufacturing the trim panel, which is divided into two broad phases: PHASE A for manufacturing the central core that forms the trim panel (18), i.e. the process of manufacturing the first sheet of foam; and the second, PHASE B, for manufacturing the trim panel itself from said first sheet of foam.

The process of manufacturing the central core for producing the first sheet of foam (6) begins with step a), dosing the components (1), as shown in the flow diagram in FIG. 1 and in the diagram of the facility in FIG. 2.

This step involves taking the necessary amounts of the above-described components (1) to produce the mixture of the components (1).

The components (1) can be dosed from the above-described pre-mixtures, for example.

Once the components (1) that will form the mixture of components (1) have been dosed, the next step of the process is step b), heating and homogenising the components (1).

To carry out this second step of the process in which a sheet (3) is produced by heating and homogenising the components (1), a means of heating and homogenising is used to carry out these two operations. The components (1) are therefore added to the means of heating and homogenising. This operation can be carried out by adding all of the components at the same time or by adding them in stages, depending on the starting combination that is used.

Heating the components (1) softens the polyolefin (1.1), which results in the homogenisation of the components (1) to eventually produce a homogeneous mixture (2.6) thereof. In this step, the temperature of the homogeneous mixture (2.6) of components (1) is preferably between 90 and 150[deg.]C. Within this temperature range, the polyolefin (1.1) is softened without being degraded.

Once the homogeneous mixture (2.6) of components (1) has been produced, step c) is carried out to produce a thermoplastic sheet (3) from the homogeneous mixture (2.6) of components (1) produced in step b). This operation is carried out using a means of forming the homogeneous mixture (2.6) of components (1) into a sheet (3) by applying pressure.

The above-described steps b) and c) can be carried out, for example, in a polymer extruder (2), which is described in detail below.

The components (1) can be added to the extruder (2) by a hopper (2.1) so that the operation is carried out in a single step or they can be added to different parts of the extruder (2) by small hoppers that are not shown, which can be situated along the main screw (2.2) of the extruder (2). Thus, at least one of the components (1) enters first, either separately or forming part of a pre-mixture, and is melted in the main screw (2.2), then another of the materials (1) is added, and so on until all of the components (1) have been added.

At the end of the main screw (2.2) and before reaching the outlet (2.4) of the extruder (2), a homogeneous mixture (2.6) of components (1) is produced due to the mechanical action combined with a rise in the temperature of the materials (1) by means of both the heating of the barrel (2.5) and friction of the materials. Step b) of the process is now complete.

The outlet (2.4) is the element situated at the end of the extruder (2) wherethrough the homogeneous mixture (2.6) of components (1) flows out of the extruder (2) and, thanks to this outlet (2.4), the homogeneous mixture (2.6) acquires the desired profile, which in this case is a sheet profile. A sheet (3) formed by the homogeneous mixture (2.6) of components (1) is thus produced, completing step c) of the process.

As regards the polymer extruder (2), several types could be used depending on the number of screws (2.2) that are situated in the barrel (2.5). The most widely used extruders are single-screw, with one screw in the barrel (2.5), or double-screw, with two screws in the barrel.

For example, if the fibre reinforcement (1.2) is not mixed with polyolefin (1.1), it would be advisable to use a double-screw extruder, as the mixing is more intense with this type of extruders. If the fibre reinforcement (1.2) is already mixed with polyolefin (1.1), it would be sufficient to use a single-screw extruder.

The sheet (3) that is produced is 1 to 10 mm thick, 350 to 1000 mm wide, depending on the limitations of the means used in step c) to form the sheet (3) and on the dimensions of the trim panel (18) to be produced from the first sheet of foam (6), and the length will depend on the corresponding application, it being possible to store it in formats or in rolls if the process is not carried out continuously; otherwise, the sheet (3) can move on continuously towards the next step of the process without it stopping.

Once the sheet (3) has been produced, the next step begins, step d), heating, cross-linking and foaming the sheet (3) produced in step c).

In this step the sheet (3) is cross-linked, i.e. a three-dimensional network is formed by binding the different polymer chains that make up the polyolefin (1.1). This network will prevent the gases provided by the foaming agent from escaping freely.

The sheet (3) is also heated in this step d) to bring about the foaming of said sheet (3). The heating temperature of said sheet is preferably between 170-320[deg.]C., thus ensuring the foaming of the sheet (3) and preventing the degradation of the polyolefin (1.1). Said heating of the sheet (3) causes the foaming agent that forms part of the sheet (3) to decompose, releasing a gas and thus bringing about the foaming of the sheet (3).

The sheet (3) must be foamed in such a way as to permit the free (three-dimensional) expansion thereof, i.e. when the sheet (3) is foamed there are no physical elements in contact with it that could impede its free three-dimensional expansion.

The above-described heating, cross-linking and foaming steps do not necessarily have to be carried out in that order. This will depend on the type of cross-linking of the sheet (3) that is carried out in the process.

For example, if the cross-linking is carried out by a physical cross-linking process, it will be done before the steps of heating and foaming the sheet (3). This physical cross-linking process can be carried out by radiation or electron bombardment. This physical cross-linking process consists of subjecting the sheet (3) to a bombardment with an electron beam generated by a radiation source, which is in turn subjected to a difference of potential.

Another example would be a chemical process wherein the cross-linking is carried out by the action of reactive agents, so that said cross-linking is carried out once the heating step has begun and will finish before the foaming step ends. In this case, the application of heat during the heating step will bring about the decomposition of the cross-linking agent in addition to the decomposition of the foaming agent.

If the polyolefin is cross-linked by a physical process, once this cross-linking is completed, the heating and foaming steps can be carried out using different types of equipment, e.g. in a vertical oven or a horizontal oven.

If a vertical oven is used for the physical cross-linking process, the sheet (3) enters through the top of a vertically-positioned oven and is suspended as it moves therethrough so that it does not come into contact with the walls thereof at any time in order to favour the free three-dimensional foaming of the sheet, producing a foamed sheet product (5) at the end of the oven.

In the case of the horizontal oven for the physical cross-linking process, the sheet (3) can enter the oven on a conveyor belt once the heating begins, which will bring about the decomposition of the foaming agent to start the foaming process, and the sheet (3) is supported by an air cushion that permits the free expansion thereof so that the foamed sheet product (5) is produced at the end of the oven.

If the polyolefin is cross-linked by means of a chemical process, a horizontal oven will be used to carry out the heating, cross-linking and foaming steps, which is explained in more detail below.

The oven (4) for the chemical cross-linking process is divided into two parts, a first heating part (4.1) and a second foaming part (4.2), so that the unfoamed sheet (3) enters the first part (4.1) of the oven (4) and moves forward towards the second part (4.2) thereof until the foamed sheet product (5) is continuously produced at the end of the second part (4.2).

The sheet (3) enters the first part (4.1) of the oven (4) on a mobile support, such as, for example, a conveyor belt (4.1.1). Here, the sheet is heated to a temperature of 170 to 320[deg.] C., thus ensuring the foaming and preventing the degradation of the material.

The sheet (3) then loses consistency as the raised temperature causes the polyolefin (1.1), the main component of the sheet, to soften, thereby making it necessary to transport the sheet (3) along the aforementioned conveyor belt (4.1.1).

Once the decomposition temperature of the cross-linking agent is reached, the radicals that will form new links in the polyolefin (1.1) are generated (e.g. with polyethylene), increasing the rigidity of the sheet (3).

Heating the sheet (3) also causes the foaming agent to start to decompose. By that time, most of the cross-linking agent has already decomposed and has reacted to form more links in the polyolefin (1.1), thus improving the rigidity of the sheet (3). Having reached this point, the sheet (3) is rigid enough to support its own weight without the need for the conveyor belt (4.1.1).

To transport the sheet (3) in this second part (4.2) of the oven (4), and to favour the free (three-dimensional) expansion of the sheet (3) at the stage when the strong decomposition of the foaming agent begins, a hot air cushion (4.2.1) is used as a means of transporting and supporting the sheet (3) during the foaming process. Thus, a foam sheet product (5) is produced at the end of the second part (4.2) of the oven (4) that has freely and three-dimensionally foamed, with a density of between 25 and 250 kg/m$^3$, a thickness of 3 to 20 mm and a width of 500 to 2500 mm, its length depending on the dimensions of the trim panel (18) produced from the first sheet of foam (6).

The foamed sheet product (5) produced in step d) has irregular lateral areas (5.1), as it is complicated to control the process perfectly so that the three-dimensional foaming is uniform, especially in the lateral areas of the foamed sheet product (5). Therefore, in step e) the foamed sheet product (5) is cut, in particular the irregular lateral areas (5.1) of the foamed sheet product (5), which are normally situated on the lateral edges of the foamed sheet product (5).

Another possible cutting operation that can affect the foamed sheet product (5) is cutting to produce formats, which can be defined as sheets of foam (6) of specific dimensions according to those required by the trim panel to be produced.

Finally, and as can be seen in FIG. 6, another possible cutting operation that could affect the foamed sheet product (5), or the first sheet of foam (6), is to produce at least two thinner sheets of foam (16, 17) from a foamed sheet product (5) (or first sheet of foam (6)) by using a means of cutting (15) to make one or more longitudinal cuts in the foamed sheet product (5) (or first sheet of foam (6)) along parallel planes to the upper and lower faces (6.3) thereof.

Another optional step that can be carried out before step e) or after this same step is a laminating step x) with at least a third sheet (13).

This laminating step can be carried out continuously, without stopping the process, or by means of a separate process after storing the foamed sheet product (5) (or the first sheet of foam (6), if it is carried out after the cutting step e)). Therefore, when the laminating process is described with reference to the foamed sheet product (5), this same process is also applicable to the first sheet of foam (6).

The foamed sheet product (5) is laminated by heating the surface of the foamed sheet product (5). This surface heating softens the surface of the thermoplastic material that forms part of the foamed sheet product (5). For the lamination to be carried out properly, the percentage of thermoplastic material contained in the foamed sheet product (5) should be between 60 and 99%.

This softened thermoplastic material acts as a binding element for laminating other layers (13) onto the foamed sheet product (5).

This softening can be carried out using different means of heating the surface of the foamed sheet product (5).

Figure 3:
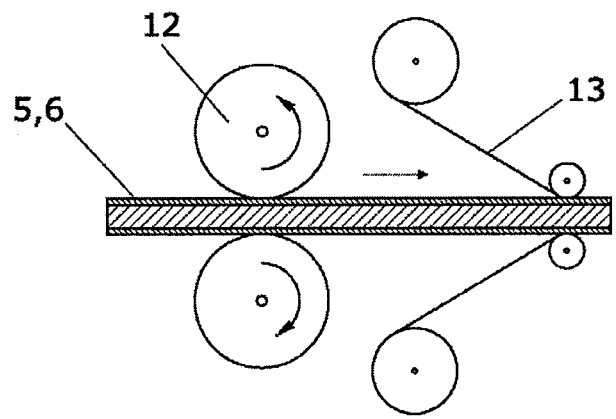
FIG. 3 shows a diagram of a first example of the means of heating the surface of the first sheet of foam used to carry out the lamination thereof with other sheets.

A first example of a means of heating the surface consists of hot rollers (12), as shown in FIG. 3. In this process, the sheet is passed through one or more pairs of hot rollers that soften the surface of the thermoplastic material as the foamed sheet product (5) passes therethrough.

Once one or more sheets (13) have been laminated onto the foamed sheet product (5), the irregular areas (5.1) of the sheet are removed and/or formats are cut.

Figure 4:
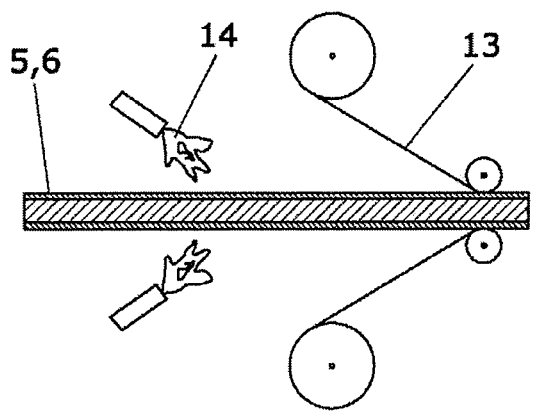
FIG. 4 shows a diagram of a second example of the means of heating the surface of the first sheet of foam used to carry out the lamination thereof with other sheets.

A second example for heating the surface of the foamed sheet product (5) is by using a blow torch (14) that is applied directly to the foamed sheet product (5), as shown in FIG. 4. The effect is the same as in the previous case, softening the surface of the thermoplastic material of the foamed sheet product (5) to adhere at least a third sheet (13) thereto.

Figure 5:
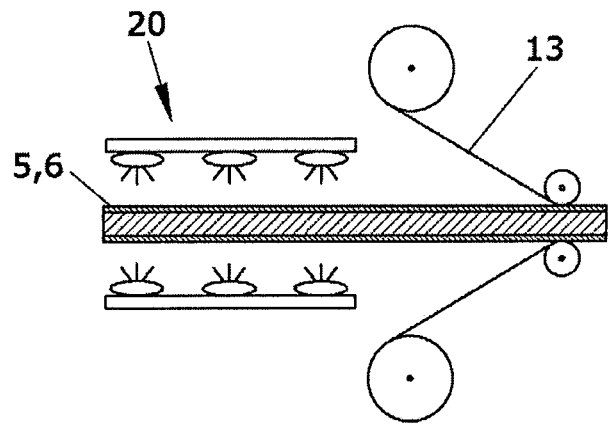
FIG. 5 shows a diagram of a third example of the means of heating the surface of the first sheet of foam used to carry out the lamination thereof with other sheets.

A third example for heating the surface of the foamed sheet product (5) is by using an infrared oven (20), as shown in FIG. 5. In this case, as in the previous examples, the surface of the thermoplastic material of the foamed sheet product (5) is softened to adhere at least a third sheet (13) to the foamed sheet product (5).

An example of this third sheet (13) could be a thermoplastic film. The purpose of this film would be to facilitate the adherence between the second sheet of covering (10) and the first sheet of foam (6) in cases where, due to the nature of the second sheet of covering (10), the thermoplastic material that is melted in step f), pre-heating the first sheet of foam (6), were not sufficient to achieve a good adherence between the two sheets (6, 10).

In exceptional cases, this third sheet (13) could also be a sheet of reinforcement material, e.g. to provide additional rigidity in specific areas.

At least a third sheet (13) can be laminated onto one or both of the principal surfaces of the foamed sheet product (5), depending on the need.

PHASE B of the process describing the manufacturing process of the trim panel (18) itself begins with step f), pre-heating the first sheet of foam (6) in an oven (7).

In this oven (7), which could be, for example, an infrared oven, the first sheet of foam (6) is heated to a temperature of between 180 and 225[deg.]C., this temperature being sufficient to soften the polyolefin to facilitate the forming of the first sheet of foam (6) in the following step g), and remaining below the limit above which the polyolefin (1.1) would begin to degrade.

Once step f) is completed, pre-heating the first sheet of foam (6), step g) begins, forming the first sheet of foam (6).

In this step, pressure is applied to the first sheet of foam (6) by a forming press (8) that has a mould (8.1) that copies the shape of the trim panel (18) that is to be produced. The forming press (8) does not require an additional heating system and it is therefore referred to as cold forming. However, the first sheet of foam (6) reaches this forming press (8) at a sufficient temperature to facilitate the forming thereof.

In addition to forming the first sheet of foam (6) in step g), step h) is carried out, coving the first sheet of foam (6) by applying a second sheet of covering (10) that corresponds with at least one of the upper and lower faces (6.3) of the first sheet of foam (6) so that this second sheet, as well as being adhered to the first sheet of foam (6) and optionally to other sheets that form the substrate, also copies the shape of the trim panel (18) that is to be produced. Therefore, step h), covering, involves adhering this second sheet of covering (10) to the substrate and forming said sheet (10) by copying the shape of the trim panel (18) that is to be produced.

The second sheet of covering (10) provides the first sheet of foam (6) with a good outer finish, which, in the case of an aesthetic finish, the user can see and feel when inside the vehicle. These coverings of the visible face can consist of, for example, a sheet of woven or non-woven fabric, or non-fabric material.

This step h) can be carried out after step g), cold forming, or at the same time, i.e. forming and covering the first sheet of foam (6) can be carried out in the same forming press (8) in a single operation, as can be seen in FIG. 2 (variant 1), wherein both the first sheet of foam (6) and the second sheet of covering (10) are placed in the forming press (8) so that the forming and covering are carried out at the same time.

Another option consists of carrying out steps g) and h) consecutively, as can be seen in FIG. 7 (variant 2), so that first the first sheet of foam (6) is formed in the forming press (8), by placing said sheet in the forming press (8) and then the first sheet of foam (6) is covered by placing the first sheet of foam (6), once formed, and the second sheet of covering (10) in correspondence with at least one of the upper and lower faces (6.3) of the first sheet of foam (6) in the covering press (9).

The decision as to whether these two steps are carried out at the same time (variant 1) or consecutively (variant 2) will depend on whether the trim panel (18) is to be subjected to a final crimping step or not.

This optional crimping operation z) of the trim panel (18) consists of covering the outer edge of the trim panel (18) with an excess of covering. This operation is carried out by adhering the excesses of material (10.1) to the areas of the substrate (consisting of the first sheet of foam (6) and optionally other sheets (13)) formed by the trim panel (18) that are to be crimped.

If the crimping operation is not necessary, steps g) and h), cold forming and covering, respectively, are carried out at the same time by means of a single operation using a single forming press, as can be seen in FIG. 2.

In this case where the press performs both the forming (8) and covering operations, since the two steps are carried out at the same time, the first sheet of foam (6) and at least the second sheet of covering (10) are positioned so as to correspond with at least one of the upper and lower faces (6.3) of the first sheet of foam (6). Thus, the trim panel (18) would be produced with a single movement.

In this case the cutting to remove the surplus material, step i), could be carried out in the same forming press (8) or in a separate operation using a suitable means of cutting (11).

This cutting to remove the surplus material, step i), from the first sheet of foam (6) can include cutting the outer edge of the first sheet of foam (6) with the final dimensions of the trim panel (18) and punching the necessary holes to assemble the accessories (sun visors, consoles, housings, handles, etc.) on the trim panel (18).

In addition to the first sheet of foam (6) and the second sheet of covering (10), other sheets could be placed in the forming press (8), e.g. at least a fourth sheet that is placed directly in the press with the other sheets (6, 10, 13). In this case, although the second sheet of covering (10) is positioned on one of the upper and lower faces (6.3) of the first sheet of foam (6), it is not positioned directly over the first sheet of foam (6), but rather over the other sheets (13) that form part of the substrate together with the first sheet of foam (6).

This fourth sheet could be a reinforcement sheet, or localised reinforcement elements for certain areas of the trim panel (18) wherein a different rigidity than in other areas is required, and as an exception, these reinforcement sheets may be manufactured from fibre reinforcement.

However, these fibre reinforcements would involve a much smaller amount of reinforcement than that needed in a conventional manufacturing process of trim panels, because in this case the central core includes fibre reinforcement (1.2), as it forms an integral part of the first sheet of foam (6).

If the final crimping operation is required, steps g) and h) are carried out consecutively rather than simultaneously, as the corresponding cuts must be applied to the formed first sheet of foam (6) before covering the first sheet of foam (6), so that it can then be covered with a second sheet of covering (10) with an excess of material (10.1) in the areas that can be crimped. This variant of the process can be seen in detail in FIG. 7.

In this case, before carrying out step h), covering, a gluing step y) must be carried out using a means of adhesive application (19) to apply an adhesive between the second sheet of covering (10) and the first sheet of foam (6) in order to join the second sheet of covering (10) to the first sheet of foam (6).

Once the adhesive has been applied, both the formed first sheet of foam (6) and the second sheet of covering (10) with an excess of material (10.1) that is needed for the crimping step are placed in the covering press (9), where pressure is applied to join the sheets (6, 10) together.

The cutting operation to remove the surplus material, step i), can be carried out in the same covering machine or in a separate operation using a means of cutting (11) similar to that used in the variant of the process without crimping the trim panel (18).

Once this has been done, the process would be completed with the crimping operation.

Finally, FIG. 8 shows an example of the product made by this process, showing, in particular, the configuration of the different layers that make up the trim panel (18).

In this case the trim panel is made from two sheets, which would be the simplest configuration of the invention. These layers are the substrate, consisting only of a central core, and the second sheet of covering (10).

As can be seen in FIG. 8, the central core consists of the first sheet of foam (6). In particular, it shows the areas (6.2) closest to the upper and lower surfaces of the first sheet of foam (6), where the fibre reinforcement (1.2) accumulates.

In the particular case where an extruder (2) is used, this accumulation of fibre reinforcement (1.3) close to the surface of the first sheet of foam (6) occurs during step b), heating and homogenising the mixture of components (1), when the homogeneous mixture (2.6) flows out of the outlet (2.4) of the extruder (2) and is positioned predominantly on the upper and lower faces of the sheet (3) as a result of the end of the outlet (2.4) where the densest material accumulates.

The percentage of fibre reinforcement (1.2) in the first sheet of foam (6) is between 1 and 40%. If the fibre used is fibreglass, the length of this fibre reinforcement (1.3) is less than 25 mm.

Therefore, as can be seen in FIG. 6, the fibre reinforcement (1.2) forms an integral part of the first sheet of foam (6) or central core of the trim panel (18). This fibre reinforcement (1.2) is therefore sufficient to meet the rigidity requirements of the trim panel (18). As mentioned above, only in exceptional cases will it be necessary to use an additional amount of fibre reinforcement, and normally just in localised areas.

What is claimed is:

1. Method for manufacturing a vehicle trim panel that comprises the following steps:
    a. Dosing at least the following components:
    Polyolefin
    Fibre reinforcement
    Additives,
    Wherein at least one part of the polyolefin is pre-mixed with the additives to form a concentrate, and wherein the additives comprises at least one foaming agent,
    b. Heating and homogenising the components used in step a to produce a homogeneous mixture of the components,
    c. Producing a sheet made from the homogeneous mixture of components produced in step b,
    d. Heating, cross-linking and foaming the sheet produced in step c,
    e. Cutting the foamed sheet product produced in step d to produce a first sheet of foam,
    f. Pre-heating the first sheet of foam,
    g. Cold forming at least the first sheet of foam,
    h. Covering at least the first sheet of foam by applying a second sheet of covering that corresponds with at least one of upper and lower faces of the first sheet of foam,
    i. Cutting the trim panel that is produced to remove the surplus material, characterized in that the foaming of the sheet of step d is carried freely in such a way that when foaming of the sheet occurs, there are no physical elements in contact with said sheet which hinder the free three dimensional expansion of the sheet, and in that, the reinforcement fibre is accumulated in zones closest to the upper and lower surfaces of the first sheet of foam.

2. Method for manufacturing a vehicle trim panel according to claim 1, wherein the sheet is cross-linked in step d by means of a physical process before said sheet is heated and foamed.

3. Method for manufacturing a vehicle trim panel according to claim 2, wherein the heating and foaming are carried out in a horizontal oven, wherein the sheet is supported by an air cushion as it moves through the oven.

4. Method for manufacturing a vehicle trim panel according to claim 2, wherein the heating and foaming are carried out in a vertical oven, wherein the sheet enters through the top of a vertically-positioned oven and is suspended as it moves therethrough so that it does not come into contact with the walls thereof at any time in order to favour the free three-dimensional foaming of the sheet, producing a foamed sheet product at the end of the oven.

5. Method for manufacturing a vehicle trim panel according to claim 1, wherein the sheet is cross-linked in step d by means of a chemical process while the sheet is heated and foamed.

6. Method of manufacturing a vehicle trim panel according to claim 5, wherein the sheet is cross-linked in a horizontal oven.

7. Method for manufacturing a vehicle trim panel according to claim 5, wherein the cross-linking by means of a chemical process is due to the action of at least one chemical cross-linking agent that forms part of the additives.

8. Method for manufacturing a vehicle trim panel according to claim 7, wherein the at least one cross-linking agent consists of an organic peroxide with a decomposition temperature that is lower than the decomposition temperature of the at least one foaming agent.

9. Method for manufacturing a vehicle trim panel according to claim 1, wherein the cutting carried out in step e includes removing the irregular lateral edges of the foamed sheet product.

10. Method for manufacturing a vehicle trim panel according to claim 1, wherein the cutting carried out in step e produces a first sheet of foam with dimensions that correspond approximately with those of the trim panel.

11. Method for manufacturing a vehicle trim panel according to claim 1, wherein the cutting carried out in step e produces at least two sheets of foam by making at least one cut on a parallel plane to the upper and lower faces of the first sheet of foam.

12. Method of manufacturing a vehicle trim panel according to claim 1, further comprising a laminating step x of the foamed sheet product with at least a third sheet before step e or a laminating step x of the first sheet of foam with at least a third sheet after step e.

13. Method for manufacturing a vehicle trim panel according to claim 12, wherein step f, pre-heating, involves the first sheet of foam and at least the second sheet of covering and/or at least the third sheet.

14. Method for manufacturing a vehicle trim panel according to claim 13, wherein step g, cold forming the first sheet of foam, and step h, covering the first sheet of foam with at least a second sheet of covering, are carried out at the same time.

15. Method for manufacturing a vehicle trim according to claim 1, wherein step f, pre-heating, only involves the first sheet of foam.

16. Method for manufacturing a vehicle trim panel according to claim 15, further comprising a gluing step y, by using a means of adhesive application to apply an adhesive between the second sheet of covering and the first sheet of foam in order to join the second sheet of covering to the first sheet of foam, is carried out after step g, cold forming the first sheet of foam, and in that a crimping step z, by covering an outer edge of the trim panel with an excess of second sheet of covering, is carried out after step h, covering the first sheet of foam, and step i), cutting to remove the surplus material.

* * * * *